(12) United States Patent
Wespel et al.

(10) Patent No.: US 10,346,518 B2
(45) Date of Patent: Jul. 9, 2019

(54) CLOUD BASED REPUTATION SYSTEM FOR BROWSER SETTINGS

(71) Applicant: Avast Software s.r.o., Prague (CZ)

(72) Inventors: Thomas Wespel, Mietingen (DE); Thomas Salomon, Neukirch (DE)

(73) Assignee: AVAST SOFTWARE S.R.O., Prague (CZ)

( * ) Notice: Subject to any disclaimer, the term of this patent is extended or adjusted under 35 U.S.C. 154(b) by 475 days.

(21) Appl. No.: 14/879,892

(22) Filed: Oct. 9, 2015

(65) Prior Publication Data

US 2016/0103929 A1  Apr. 14, 2016

Related U.S. Application Data

(60) Provisional application No. 62/062,051, filed on Oct. 9, 2014.

(51) Int. Cl.
| | |
|---|---|
| G06F 3/00 | (2006.01) |
| G06F 17/22 | (2006.01) |
| G06F 21/57 | (2013.01) |
| G06F 9/445 | (2018.01) |
| G06F 3/01 | (2006.01) |

(52) U.S. Cl.
CPC ...... *G06F 17/2247* (2013.01); *G06F 9/44505* (2013.01); *G06F 21/57* (2013.01)

(58) Field of Classification Search
CPC ... G06F 17/2247; G06F 9/44505; G06F 21/57
See application file for complete search history.

(56) References Cited

U.S. PATENT DOCUMENTS

| | | | | |
|---|---|---|---|---|
| 9,110,740 | B1* | 8/2015 | Djabarov | G06F 9/4443 |
| 9,177,150 | B1* | 11/2015 | Kay | G06F 21/64 |
| 2012/0047581 | A1* | 2/2012 | Banerjee | G06F 21/554 |
| | | | | 726/24 |
| 2012/0320415 | A1* | 12/2012 | Nakamura | G06K 15/02 |
| | | | | 358/1.15 |
| 2013/0007593 | A1* | 1/2013 | Ichimi | G06F 17/30905 |
| | | | | 715/234 |
| 2013/0066822 | A1* | 3/2013 | Kast | G06F 17/30035 |
| | | | | 706/47 |
| 2014/0006932 | A1* | 1/2014 | Yamanaka | G06F 17/30893 |
| | | | | 715/234 |
| 2014/0280952 | A1* | 9/2014 | Shear | H04L 47/70 |
| | | | | 709/226 |
| 2015/0249872 | A1* | 9/2015 | Lee | G06Q 30/06 |
| | | | | 725/32 |

* cited by examiner

*Primary Examiner* — Nicholas Augustine
(74) *Attorney, Agent, or Firm* — Husch Blackwell LLP

(57) ABSTRACT

A method and apparatus for an automated classification and reset of browser settings is provided. A set of disreputable browser setting values is maintained based on statistics associated with the browser setting values. In response to determining that an attempt is made to set a browser setting to a value in the set of disreputable browser setting values, a notification can be presented to the user. The notification can include options in a set of reputable browser settings.

24 Claims, 6 Drawing Sheets

CLOUD BASED REPUTATION SYSTEM FOR BROWSER SETTINGS

CROSS-REFERENCE TO RELATED APPLICATION

This application claims the priority benefit of U.S. Provisional Application No. 62/062,051, filed Oct. 9, 2014. The disclosure of the above-referenced application is incorporated herein by reference in its entirety.

FIELD OF THE INVENTION

The disclosure relates generally to systems and methods for maintaining settings in browser applications, and more particularly, to a cloud based system for assessing a reputation for browser settings.

BACKGROUND

The Internet is a worldwide public system of computer networks providing information, shopping capabilities and other kinds of business opportunities accessible to tens of millions of people worldwide. The most widely used part of the Internet is the World Wide Web, often abbreviated "WWW" or simply referred to as just "the web." The web is an Internet service that organizes information through the use of hypermedia. The HyperText Markup Language ("HTML") is typically used to specify the contents and format of a hypermedia document (e.g., a web page). Other popular formats to display contents of a web page are JAVA™, the Portable Document Format (PDF), AJAX, Adobe Flash or Microsoft Silverlight. Hypertext links refer to other documents by their universal resource locators (URLs). A client program, known as a browser, e.g. MICROSOFT® INTERNET EXPLORER®, GOOGLE® CHROME®, MOZILLA® FIREFOX®, APPLE® SAFARI®, runs on the user's computer and is used to render the content of a web page and display it in human readable form. The browser is also used to follow a link, e.g., send a query to the web server.

Browsers provide a base for the largest advertising marketplace in the world, the World Wide Web. A common way to gain market share in this market has proved to be through the homepage and the search provider of the browser. Since this market is a multi-billion dollar one, many companies have started to hunt for market share by resetting users' browsers to a certain search company. What began as normal competition has changed when mostly camouflaged offers, presented as "Opt-Out," came to market, bundled with software that is not related to browsers or to search pages. One example of such an "Opt-Out" offer can be seen in FIG. 6, which shows an opt-out offer 602 that appears when installing JAVA. In order for the user to avoid having their default search provider (DSP) and homepage (HP) changed, the user must actively deselect the checkboxes 604.

Over time, the number and variety of such opt-out offers has become almost overwhelming to the point where much software installation software, whether for a PDF reader, CD-Burning software or JAVA, includes an opt-out offer that can result in an unwanted change to a user's previous choice of search provider and/or home page. An average user typically overlooks the pre-selected option to reset the search provider or homepage, typically thinking that keeping the checkboxes selected is the way to accept end-user license agreement (EULA) or privacy terms, or that the opt-out offer is a recommended option for the installed program.

Further, because many offers nowadays are camouflaged as opt-out (e.g., the user has to uncheck a setting if he doesn't want the offer), users that are in hurry and don't read or users that simply don't understand the connection between the desired program and the hijacking of the browser end up with a different and unwanted settings for the installed browsers on the user's computer.

The browsers (e.g. Microsoft Internet Explorer, Google Chrome or Mozilla FireFox) typically do not offer any history of settings or an easy way to reset the hijacked settings back to previous values. Typically the only way to reset the browser that is offered by the browser itself is the one to the search settings the browser vendor monetizes best. Therefore a hijacked user has either to reset any of the installed browsers manually to the search settings the browser vendor monetizes or the user has to reset the single settings for homepage and search provider manually on each browser using settings that look different on each browser and that are technically quite complicated.

BRIEF DESCRIPTION OF THE DRAWINGS

For a better understanding of the inventive subject matter, reference may be made to the accompanying drawings in which.

DETAILED DESCRIPTION

Figure 1:
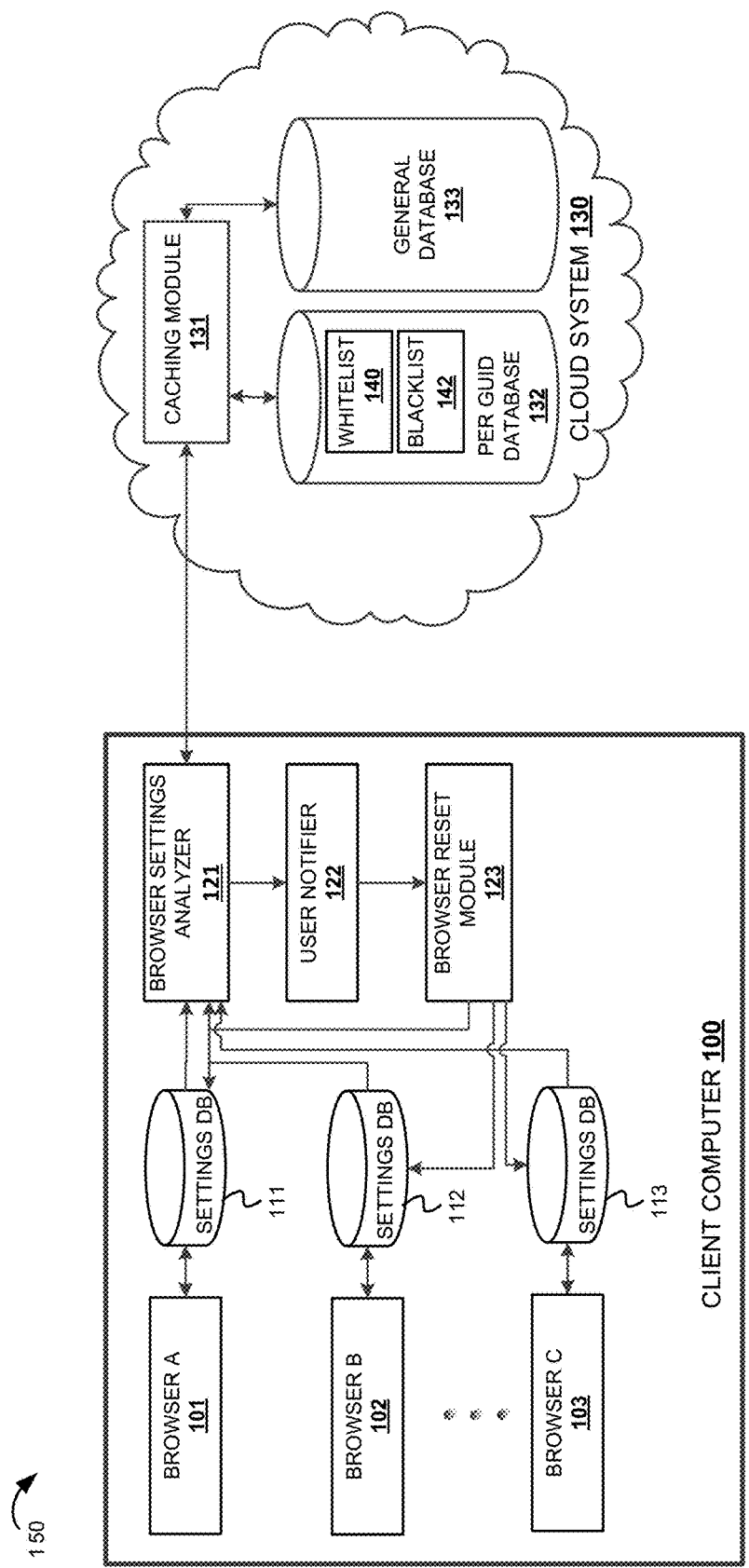
FIG. 1 is a block diagram of a system including client and backend systems for analyzing browser settings according to embodiments.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

The disclosure includes systems and methods to detect browser hijackings. In some embodiments, the systems and methods offer an understandable and cross browser way to reset a homepage setting, a search provider setting, or other settings based on a combination of one or more of historical settings, country, language, default browser and other variables that can be anonymously collected from millions of users in a cloud system. The user can then be offered a way to reset installed browsers to the settings the user desires without having to learn the constantly changing settings of each individual browser on a user's system. Thus a method and apparatus for an automated classification and the reset of browser settings can be provided.

FIG. 1 is a block diagram of a system 150 including client and backend systems for analyzing browser settings according to embodiments. The client computer 100 can be a typical computer running using a Microsoft Windows, Apple Macintosh or any other operating system. The computer can have one or more different browsers. Examples of such browsers may include Microsoft Internet Explorer, Google Chrome, Mozilla FireFox, Apple Safari etc. The embodiments are not limited to any particular type or brand of browser. In the example illustrated in FIG. 1, three browsers (e.g., browser A 101, browser B 102, and browser C 103) are shown as installed on computer 100. Those of skill in the art having the benefit of the disclosure will appreciate that a user may install more or fewer browsers on a computer 100.

Each type of browser may use a different way to store its settings into a database 111, 112, 113. The settings can be stored in the settings databases 111, 112 and 113 that correspond respectively to browser A 101, browser B 102 and browser C 103. The settings databases can contain the settings for homepage and for the default search provider for the respective browser, among other settings.

System 150 can include a browser settings analyzer 121. The browser settings analyzer 121 can create a GUID per computer and user, and can read the settings database of installed browsers (e.g., settings databases 111, 112 and 113). Further, browser settings analyzer 121 can extract information regarding the default browser, the language, the country and the current settings of homepage and default search provider for a browser. This information can be sent via a network such as the internet to the cloud system 130 where the data can be analyzed. The browser settings analyzer 121 can be configured to run based on certain events. Examples of such events include, but are not limited to:

Installation of a browser
Installation of any new program
Malware found on computer 100
Malware scan of computer 100
User logon
Operating system boot of computer 100

Additionally, browser settings analyzer 121 can be scheduled to run at periodic time intervals.

The cloud system 130 can include a caching module 131 that can receive incoming requests and store the received data per computer, user and browser in a per GUID (Globally Unique Identifier) database 132. The data stored in per GUID database 132 provides historical data for use in later analysis that would not otherwise be available. Additionally, the stored data can provide a base for a reputation system described below with reference to FIG. 2.

In some embodiments, the collected settings for homepage or search provider can be checked against one or more blacklists 142 or whitelists 140. In some implementations, the blacklists 142 or whitelists 140 can be stored in a general database 133. However, the blacklists 142 or whitelists 140 can be stored separately from general database 133.

During operation of the above described system, when a browser is found with a blacklisted setting, the caching module 131 can return an indication that the setting is blacklisted along with recommended settings for a potential reset. In addition, the caching module can provide whitelisted settings to the browser settings analyzer 121. Browser setting analyzer 121 can trigger the user notifier 122 that a browser setting has been changed to a blacklisted value. The user notifier 122 can inform the user about the potential hijacked browser settings and can present an offer to the user to reset the settings across all browsers with either a single or multiple choices for a combination of homepage and default search provider settings. The user's selection of the offered settings can be provided to the cloud system 130. The cloud system 130 can also decide about the layout and language of the reset process. For example, cloud system 130 can format dialogs for display to a user by notifier 122. For example, cloud system 130 can format the information as a dropdown or can utilize radio buttons. The options to be presented and the language for the presentation can be determined by the cloud system 130. User notifier 122 can create screens on the user's computer for displaying the information in the fonnat chosen by cloud system 130. Various example dialogs that can be used by cloud system 130 are presented in FIG. 3.

After the user notifier 122 presents the dialog or other screens to the user, the user can select a desired option via the user interface displayed by user notifier 122. If the user decides to accept the offered reset, the browser reset module 123 writes the changes into the settings databases 111, 112 and 113 of respective browsers 101, 102 and 103. Existing settings that have been reported as being on the whitelist 140 by the cloud system 130 are not reset. In some aspects, the cloud system 130 can provide information to browser reset module 123 as to how to perform a reset for the browser or browsers installed on a user's computer 100. For example, cloud system 130 can provide URLs for the search provider that is to be used after the reset, the homepage, icons, setting scripts etc. that can be used or set by browser reset module 123.

Once the reset has been performed the information regarding the changes can be sent back to the cloud system 130 through a further analysis by the browser settings analysis module 121. The further analysis can be triggered by a command sent to the browser settings analysis module after a reset. The further triggered analysis can be used to determine if the browser reset was successful. For example, some browser extensions may attempt to disable browser resets. The further analysis can detect whether the changes from the reset were successfully applied or whether the changes were either disabled or altered by a malicious browser extension. The changes and other information from the reset can be stored in the per GUID Database 132.

FIG. 1 and the description above have been provided in the context of cloud system 130 providing certain functionality. Alternative implementations may provide the functionality described above in different ways. For example, in some aspects, the functionality of cloud system 130 may be provided in a server such as an enterprise server. Information provided to an enterprise server may comprise information from computers within an enterprise and thus may be more limited than that available to cloud system 130. In alternative aspects, a multi-tiered system may be used in which an enterprise server receives information about computers within the enterprise and may also receive statistical information from cloud system 130. In this case, the enterprise system can prevent information regarding enterprise employees from being sent to the cloud system, but can receive the benefit of the statistical analysis of a bigger population that can be provided by cloud system 130.

Figure 2:
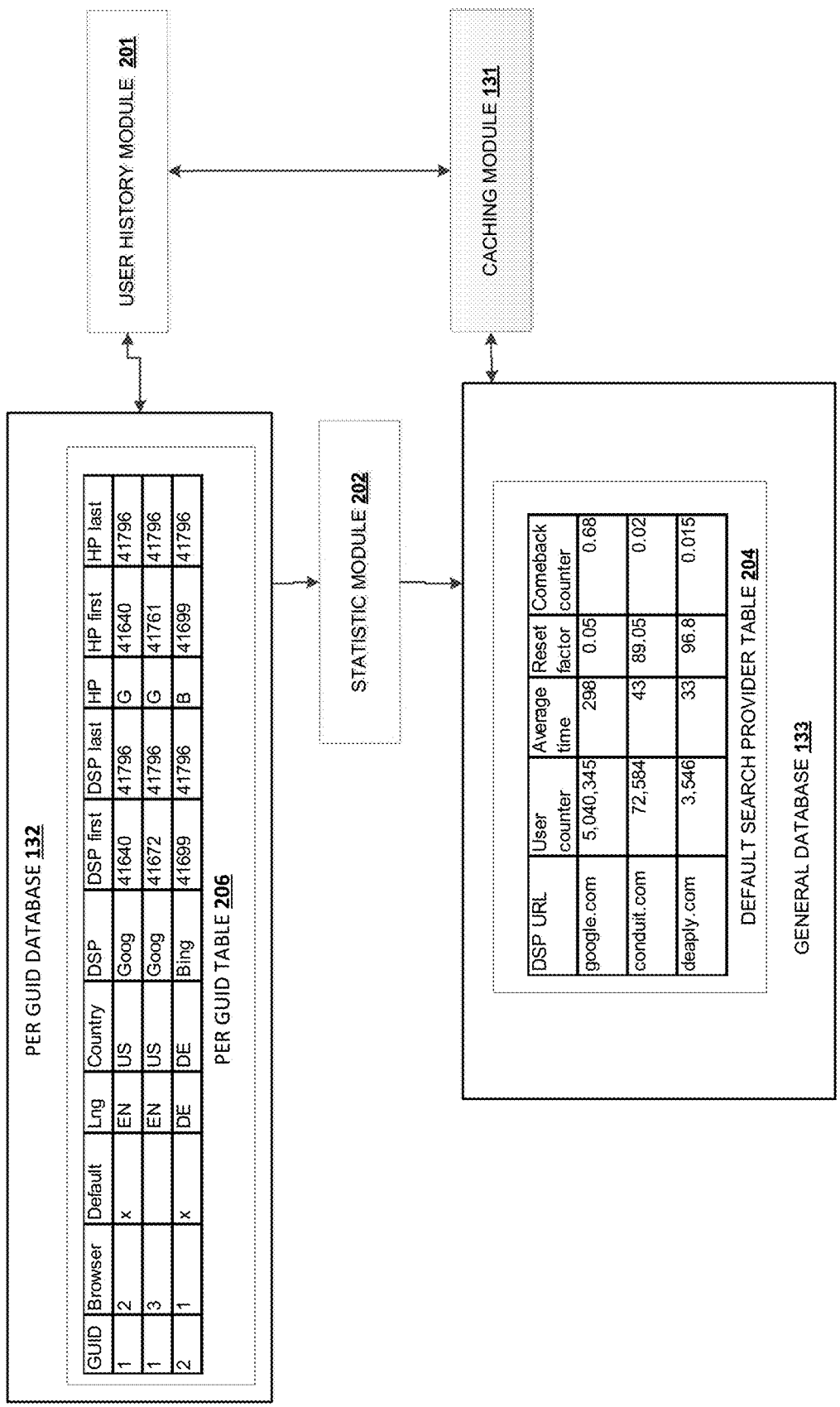
FIG. 2 is a block diagram that provides further details on data tables used in embodiments.

FIG. 2 is a block diagram that provides further details on data tables used in embodiments and how such data is used in cloud system 130. The cloud system 130 can store historical data per user/computer GUID for installed browsers. A per GUID table 206 shows example fields used in some embodiments:
 GUID: The "Globally Unique Identifier," used to store a history for a given user.
 Browser: An integer value representing a supported browser, e.g. 1=Chrome, 2=FireFox etc.
 Default: A Boolean that indicates whether this browser was used as the default browser or not.
 Lng: The language the browser is configured for.
 Country: The country the system and/or the GeoIP is from.
 DSP: The URL of the default search provider (e.g. https://www.google.com?q= . . . ).
 DSP first: The first time the cloud system 130 saw the given DSP for this user & browser.
 DSP last: The last time the cloud system 130 saw the given DSP for this user & browser.
 HP: The URL of the homepage for this user & browser (e.g. http://www.avast.com).
 HP first: The first time the cloud system 130 saw the given HP for this user & browser.
 HP last: The last time the cloud system 130 saw the given HP for this user & browser.

The statistic module 202 can use the data from the per GUID Database 132 in order to compute the rating and reputation of any found DSPs or HPs using statistical methods. The statistic module 202 can also make usage of statistics regarding removed browser extensions as described in U.S. Provisional Patent Application Ser. No. 62/059,089, entitled "Cloud Based Reputation System for Browser Extensions and Toolbars", which is hereby incorporated by reference herein for all purposes.

DSP table 204 in general database 133 can provide information regarding the normalized URL of any found host used for the default search provider or the homepage. An example DSP table 204 illustrated in FIG. 2 contains:
 DSP URL: The normalized URL for a default search provider
 User Counter: The number of users using this search provider. (this information can also be provided per browser which is not shown in the example illustrated in FIG. 2)
 Average Time: The average time the given DSP stays on a computer until it is reset to a different DSP.
 Reset factor: The percentage of users that follow a suggestion to reset this search provider.
 Comeback counter: The number of users returning to this DSP after it had been reset.
 Toolbar factor: The percentage the given DSP came on the computer bundled with a browser extension.

Those of skill in the art having the benefit of the disclosure will appreciate that DSP table 204 may, in other embodiments, include various combinations of one or more of the above, and may include further data.

An HP table (not shown) may have a structure and fields similar to those described above for maintaining data regarding default home page settings and resets.

Figure 3:
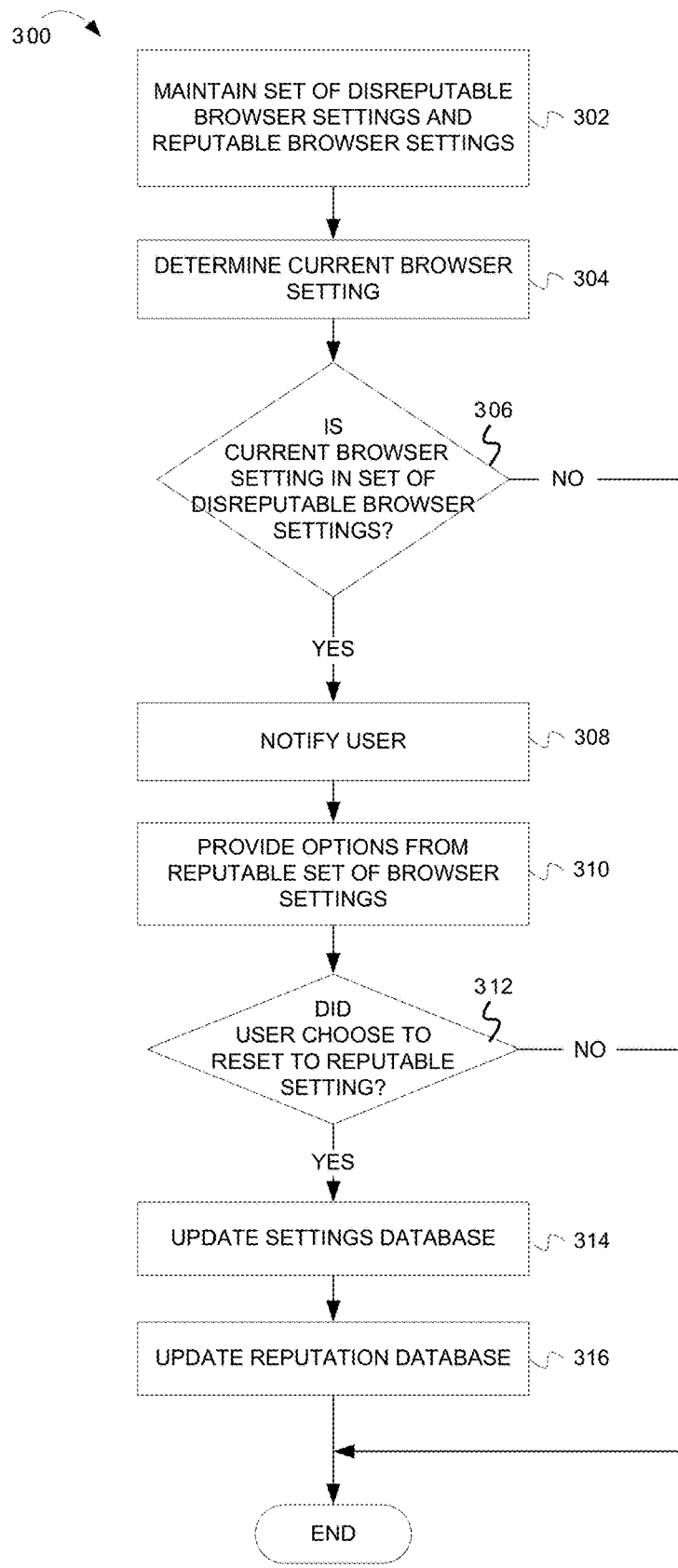
FIG. 3 is a flowchart illustrating example operations for a method for resetting browser settings according embodiments.

FIG. 3 is a flowchart 300 illustrating example operations for a method for resetting browser settings according embodiments. At block 302, a system maintains a set of disreputable browser settings and a set of reputable browser settings. For example, a cloud based system 130 can maintain a whitelist 140 comprising reputable browser settings for a default search provider and/or homepage. Further, a cloud based system 130 can maintain a blacklist 142 of disreputable browser settings.

Inclusion of a browser setting value in the list of disreputable browser settings can be determined by applying statistical analysis or other heuristics to data maintained regarding the browser setting and values for the browser setting. Examples of such statistics have been described above with respect to DSP table 204. Alternative embodiments may use other statistics, the embodiments are not limited to any particular set of statistics.

At block 304, a current browser setting is determined. For example, a browser settings analyzer 121 can inspect the browser settings for one or more installed browsers. In some embodiments, the browser settings analyzer determines one or more of a current default search provider setting and/or a current homepage setting. One of skill in the art having the benefit of the disclosure will appreciate that other browser settings may be inspected and processed.

At block 306, a check is made to determine if the current browser setting is in the set of disreputable browser settings.

If the check at block 306 determines that the current browser setting is in the set of disreputable browser settings, then the method proceeds to block 308, where the user is notified that the current value for the browser setting is dangerous or inadvisable. In addition, at block 310, the user may be presented with options for resetting the value of the browser setting to a different value. The different value can be a value from the set of reputable browser settings. Alternatively, the different value can be a default value as determined by a provider of the browser.

At block 312, a check is made to determine if the user chose to reset the value of the browser setting to a value provided as an option (e.g., a value from the set of reputable browser settings).

If the check at block 312 determines that the user chose to reset the browser setting to a value in the set of reputable browser settings, then at block 314 the system updates the settings database for the browser. In some embodiments, the changed browser setting can be applied to all of the browsers installed on the user's computer. For example, the settings database for all of the browsers installed on a computer can be updated with the browser setting value from the set of reputable browser settings. As noted above, if a browser setting has a value that is different from the disreputable value, or if the current value for the browser setting appears in a whitelist, the browser setting can be left unchanged.

Additionally, at block 316 the system can update a reputation database that maintains statistics regarding browser settings. For example, a per GUID database 132 can be updated. Additionally, a default search provider table 204 and/or homepage table can be updated with statistical data regarding the changed browser setting value.

The statistics and data gathered by the cloud based system 130 (FIG. 1) can be used to determine a reputation rating for various default search providers and homepages. For example, assume that DSP A is used 100 days on average and DSP B is replaced after 3 days on average. Cloud system 130 can assign a lower rating to DSP B than DPS A. As another example, assume that 60% follow the system provided advice to reset DSP B, but only 5% follow the suggestion for resetting DSP A. This case would also indicate that DSP B should have a lower rating than DSP A. As a further example, assume that after resetting DSP A, 40% of users return back to it after a given period of time. This can be used as an indicator that DSP A is preferred by the users. Those of skill in the art having the benefit of the disclosure will appreciate that other methods, statistics, and heuristics to compute a DSP or HP rating are possible and within the scope of the inventive subject matter disclosed herein.

Figure 4:
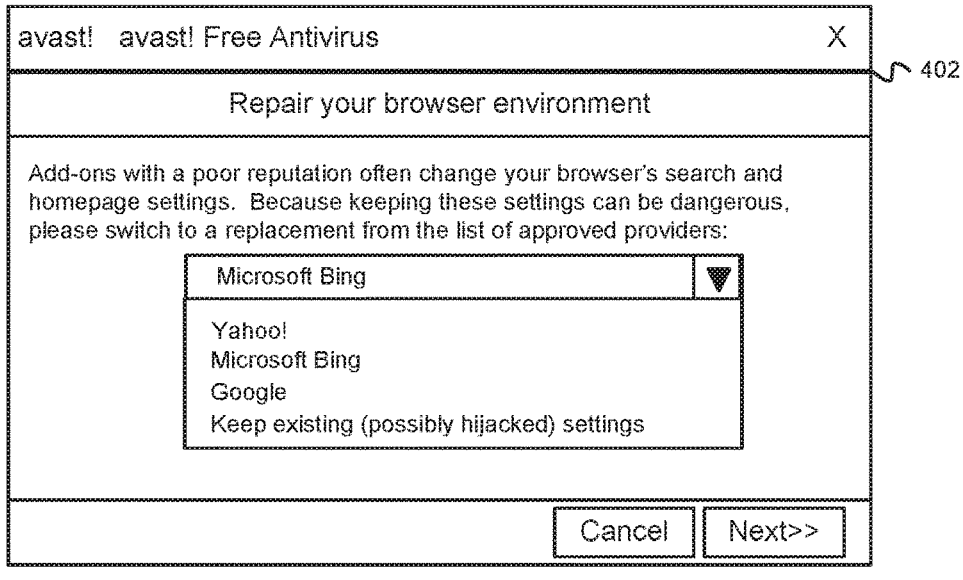
FIG. 4 provides various examples of such notifications and reset options presented in user interfaces.
Figure 4:
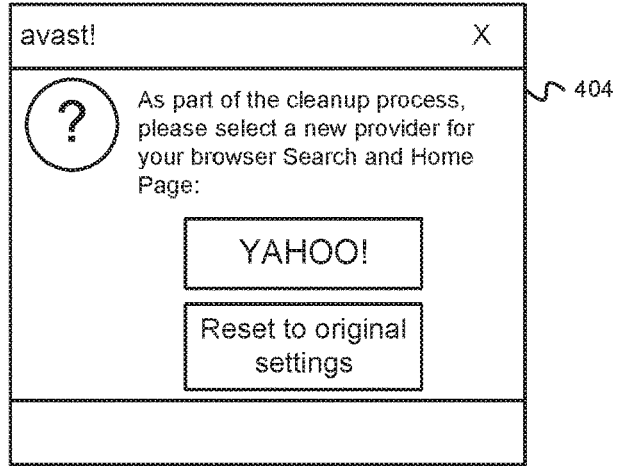
Figure 4:
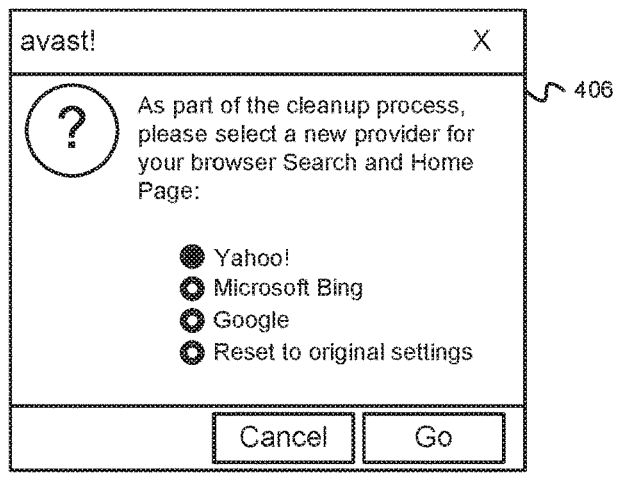

FIG. 4 provides various examples of such notifications and reset options that may be presented to a user at blocks 308 and 310 of FIG. 3. Interface 402 illustrates an example interface using a drop down box. The drop down box can include options selected from the set of reputable values for the browser setting. Interface 404 illustrates an example dialog box that provides an option for the user to select a value from the set of reputable browser settings. Interface 406 illustrates an example interface using radio buttons to select a value from the set of reputable browser settings.

Figure 5:
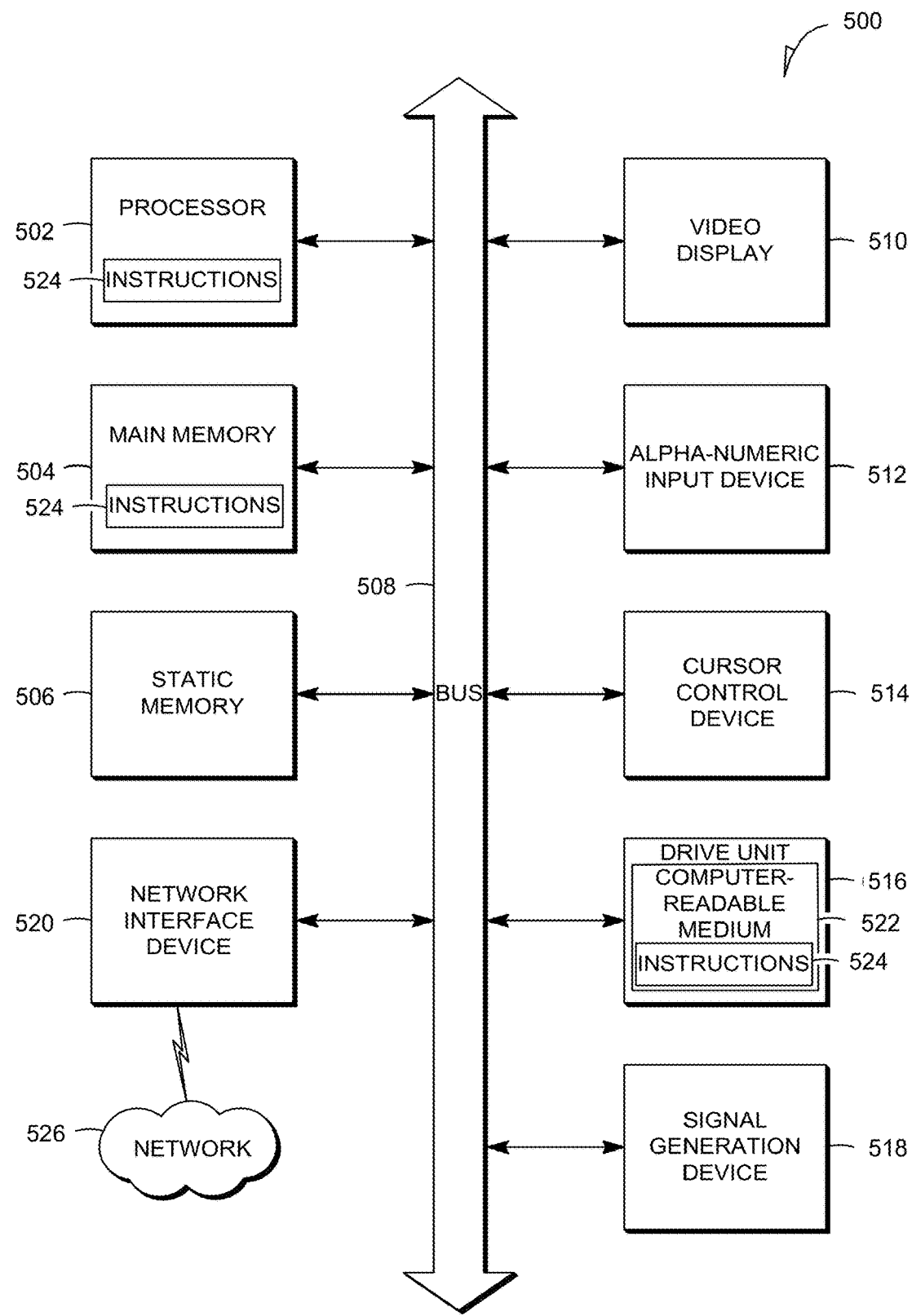
FIG. 5 is a block diagram of an example embodiment of a computer system upon which embodiments of the inventive subject matter can execute.
Figure 6:
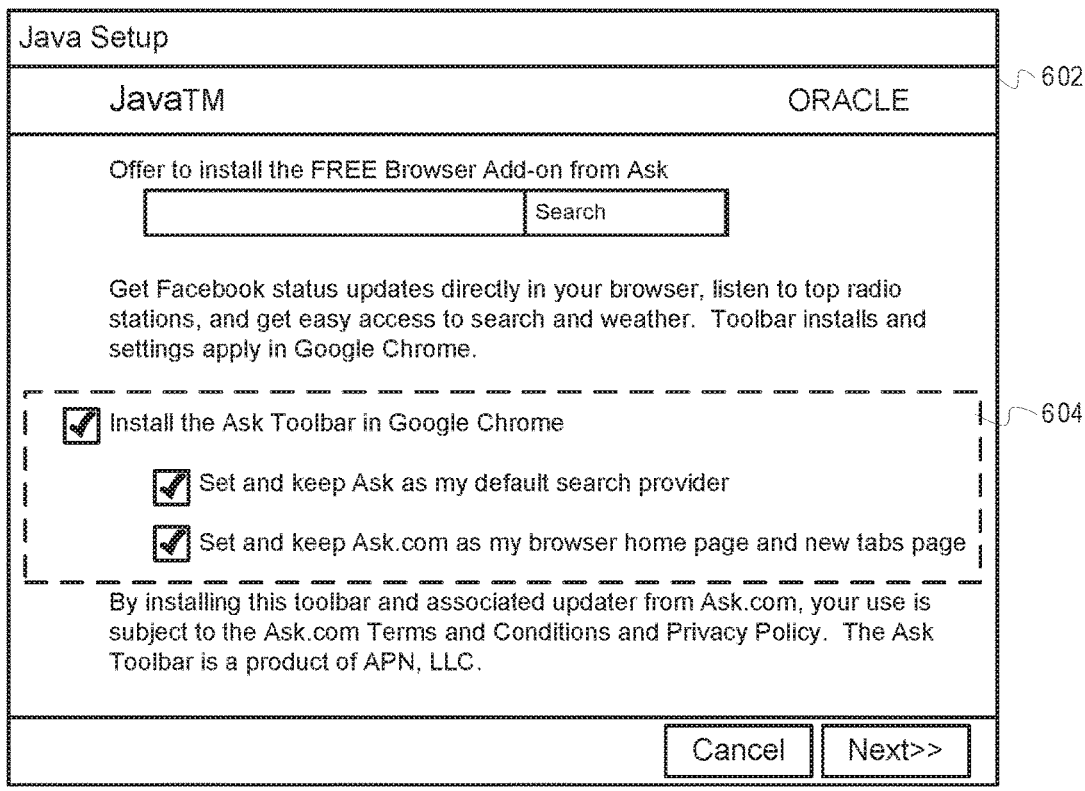
FIG. 6 provides an example installation interface.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to both servers and/or remote clients.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method comprising:
   determining reputation ratings for each of a plurality of browser setting values by applying statistical methods to historical browser setting data from a globally unique identifier (GUID) database;
   maintaining in a non-transitory machine-readable medium a set of one or more disreputable browser setting values of the plurality of browser setting values based on the determined reputation ratings thereof and a set of one or more reputable browser setting values of the plurality of browser setting values based on the determined reputation ratings thereof; and
   in response to determining, by one or more processors, that a browser setting value of one or more installed browsers has been set to a value in the set of one or more disreputable browser setting values, performing operations comprising:
      presenting a notification that the browser setting value of the one or more installed browsers is a value in the set of one or more disreputable browser setting values, and
      presenting one or more options for the browser setting value of the one or more installed browsers, wherein the one or more options are in the set of one or more reputable browser setting values.

2. The method of claim 1, further comprising adding a browser setting value of the plurality of browser setting values to the set of one or more disreputable browser setting values based, at least in part, on the determined reputation rating of the browser setting value.

3. The method of claim 2, wherein the statistics of the statistical methods include one or more of: a user counter associated with the browser setting value, an average time associated with the browser setting value, a reset factor associated with the browser setting value, a comeback counter associated with the browser setting value, or a toolbar factor associated with the browser setting value.

4. The method of claim 3, further comprising determining the average time based, at least in part, on an average amount of time the browser setting value is maintained before being reset to a different value.

5. The method of claim 3, further comprising determining the reset factor based, at least in part, on a number of users that reset the browser setting to a browser setting value in the set of one or more reputable browser setting values following the notification.

6. The method of claim 3, further comprising determining the comeback counter based, at least in part, on a number of users that return to the browser setting value after a reset of the browser setting.

7. The method of claim 1, wherein the browser setting comprises one of a default search provider for a browser or a home page for the browser.

8. The method of claim 1, further comprising:
   receiving an updated value for the browser setting, the updated value comprising at least one of the one or more options for the browser setting;
   updating the browser setting with the updated value; and
   confirming that updating the browser setting was successful.

9. A system comprising:
   one or more processors; and
   a non-transitory machine-readable medium having stored thereon instructions that, when executed by the one or more processors, cause the system to:
      determine reputation ratings for each of a plurality of browser setting values by applying statistical methods to historical browser setting data from a globally unique identifier (GUID) database,
      maintain a set of one or more disreputable browser setting values of the plurality of browser setting values based on the determined reputation ratings thereof and a set of one or more reputable browser setting values of the plurality of browser setting values based on the determined reputation ratings thereof, and in response to a determination that a browser setting value of one or more installed browsers has been set to a value in the set of one or more disreputable browser setting values:

present a notification that the browser setting value of the one or more installed browsers is a value in the set of one or more disreputable browser setting values, and present one or more options for the browser setting value of the one or more installed browsers, wherein the one or more options are in the set of one or more reputable browser setting values.

10. The system of claim 9, wherein the browser setting value is included in the set of one or more disreputable browser setting values based, at least in part, on the determined reputation rating of the browser setting value.

11. The system of claim 10, wherein the statistics of the statistical methods include one or more of: a user counter associated with the browser setting value, an average time associated with the browser setting value, a reset factor associated with the browser setting value, a comeback counter associated with the browser setting value, or a toolbar factor associated with the browser setting value.

12. The system of claim 11, wherein the average time is based, at least in part, on an average amount of time the browser setting value is maintained before being reset to a different value.

13. The system of claim 11, wherein the reset factor is based, at least in part, on a number of users that reset the browser setting to a browser setting value in the set of one or more reputable browser setting values following the notification.

14. The system of claim 11, wherein the comeback counter is based, at least in part, on a number of users that return to the browser setting value after a reset of the browser setting.

15. The system of claim 9, wherein the browser setting comprises one of a default search provider for a browser or a home page for the browser.

16. The system of claim 9, wherein the instructions further cause the system to:

receive an updated value for the browser setting, the updated value comprising at least one of the one or more options for the browser setting;

update the browser setting with the updated value; and confirm that the update to the browser setting was successful.

17. A non-transitory machine-readable medium having stored thereon instructions that, when executed by one or more processors, cause the one or more processors to:

determine reputation ratings for each of a plurality of browser setting values by applying statistical methods to historical browser setting data from a globally unique identifier (GUID) database, maintain a set of one or more disreputable browser setting values of the plurality of browser setting values based on the determined reputation ratings thereof and a set of one or more reputable browser setting values of the plurality of browser setting values based on the determined reputation ratings thereof, and in response to a determination that a browser setting value of one or more installed browsers has been set to a value in the set of one or more disreputable browser setting values:

present a notification that the browser setting value of the one or more installed browsers is a value in the set of one or more disreputable browser setting values, and present one or more options for the browser setting value of the one or more installed browsers, wherein the one or more options are in the set of one or more reputable browser setting values.

18. The non-transitory machine-readable medium of claim 17, wherein the browser setting value is included in the set of one or more disreputable browser setting values based, at least in part, on the determined reputation rating of the browser setting value.

19. The non-transitory machine-readable medium of claim 18, wherein the statistics of the statistical methods include one or more of: a user counter associated with the browser setting value, an average time associated with the browser setting value, a reset factor associated with the browser setting value, a comeback counter associated with the browser setting value, or a toolbar factor associated with the browser setting value.

20. The non-transitory machine-readable medium of claim 19, wherein the average time is based, at least in part, on an average amount of time the browser setting value is maintained before being reset to a different value.

21. The non-transitory machine-readable medium of claim 19, wherein the reset factor is based, at least in part, on a number of users that reset the browser setting to a browser setting value in the set of one or more reputable browser setting values following the notification.

22. The non-transitory machine-readable medium of claim 19, wherein the comeback counter is based, at least in part, on a number of users that return to the browser setting value after a reset of the browser setting.

23. The non-transitory machine-readable medium of claim 19, wherein the browser setting comprises one of a default search provider for a browser or a home page for the browser.

24. The non-transitory machine-readable medium of claim 17, wherein the instructions further cause the one or more processors to:

receive an updated value for the browser setting, the updated value comprising at least one of the one or more options for the browser setting;

update the browser setting with the updated value; and confirm that the update to the browser setting was successful.

* * * * *